US006325878B1

(12) United States Patent
Borgström

(10) Patent No.: US 6,325,878 B1
(45) Date of Patent: Dec. 4, 2001

(54) METHOD AND AN APPARATUS FOR PRODUCING PACKAGING CONTAINERS FOR LIQUID FOODS, AS WELL AS PACKAGING CONTAINERS

(75) Inventor: Rolf Borgström, Lomma (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/462,146

(22) PCT Filed: Jul. 9, 1998

(86) PCT No.: PCT/SE98/01358

§ 371 Date: Jan. 4, 2000

§ 102(e) Date: Jan. 4, 2000

(87) PCT Pub. No.: WO99/04962

PCT Pub. Date: Feb. 4, 1999

(30) Foreign Application Priority Data

Jul. 28, 1997 (SE) .................................................. 9702808

(51) Int. Cl.[7] .................................................. B32B 31/12

(52) U.S. Cl. .......................... 156/82; 156/497; 156/555; 156/582; 156/583.1; 156/575; 156/578; 53/376.3; 53/484

(58) Field of Search ............................ 156/82, 497, 555, 156/575, 578, 581, 582, 583.1; 53/376.3, 484

(56) References Cited

U.S. PATENT DOCUMENTS 3,902,406 9/1975 Reichert .......................... 93/31 MM
3,906,843 9/1975 Hewitt ................................ 93/61 R
3,976,528 * 8/1976 James .................................. 156/244
4,064,302 * 12/1977 Kozlowski et al. ................. 428/152

FOREIGN PATENT DOCUMENTS 3612570 10/1987 (DK) .
0237235 9/1987 (EP) .

* cited by examiner

*Primary Examiner*—James Sells
(74) *Attorney, Agent, or Firm*—Burns, Doane, Swecker & Mathis, L.L.P.

(57) ABSTRACT

The disclosure relates to a method and an apparatus (10) for producing a packaging container for liquid foods from a packaging container blank (40) by permanently uniting and sealing at least two of its edges (61, 65) with the aid of a hot melt glue, the hot melt glue being applied along one of the two edges with the aid of a heated applicator roller (11). The circumferential surface (21) of the hot roller is preferably made of hardened steel with a coating (22) countersunk in a groove int he surface along the circumference of the circumferential surface, the coating possessing good slippage properties in relation to the hot melt glue and the coating being of a width which corresponds to the region intended for application. A counter roller (14) acts on the opposite side of the packaging laminate blank against the applicator roller for controlling the outflow of the applied hot melt glue strand. How melt glue is applied to the applicator roller by means of a heated nozzle (12) and the surplus which is not transferred to the packaging laminate blank is scrapped off from the applicator roller by means of a doctor blade (15). The hot melt glue is preferably an ethylene vinyl acetate based composition with a high melting point and high viscosity which is applied at least approx. 180° C.

27 Claims, 3 Drawing Sheets

Figure 1:
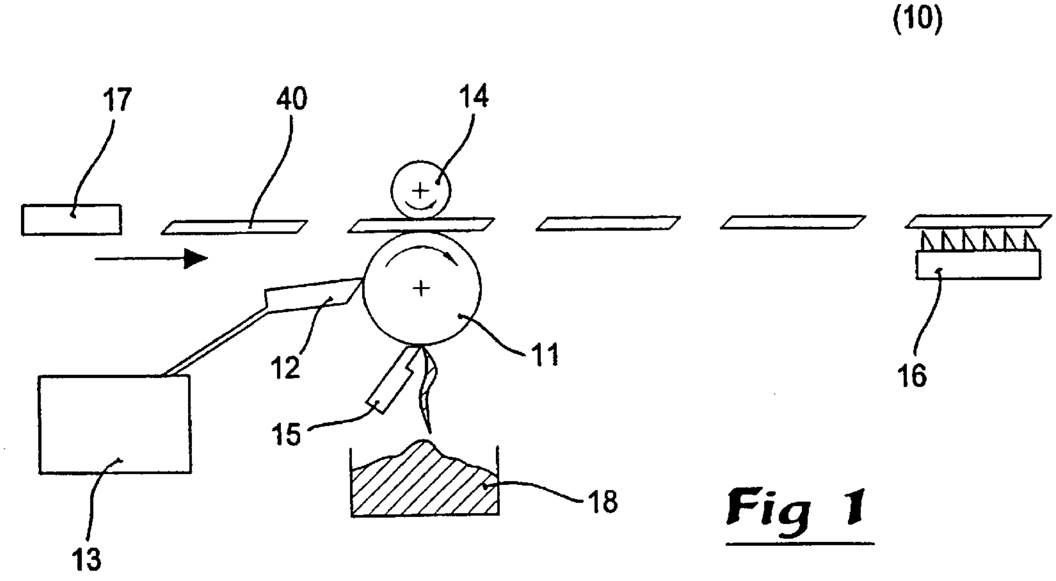

METHOD AND AN APPARATUS FOR PRODUCING PACKAGING CONTAINERS FOR LIQUID FOODS, AS WELL AS PACKAGING CONTAINERS

TECHNICAL FIELD

The present invention relates to a method of producing, from a sheet- or web-shaped packaging blank, a packaging container for liquid foods by reforming the packaging blank and permanently uniting and sealing at least two of its edges by means of a hot melt glue. The present invention also relates to packaging containers produced using the method according to the present invention and an apparatus for applying the hot melt glue and sealing a packaging blank on the production of packaging containers for liquid foods.

BACKGROUND ART

Use has long been made within the packaging industry of packages of a single-use nature (so-called single-use disposable packages) for packing and transporting products such as liquid foods. A very large group of these single-use disposable packages is produced from laminated packaging material based on an interjacent core layer of paper or paperboard and outer laminate layers of some thermosealable plastic possessing superior liquid barrier properties, normally such as low density polyethylene (LDPE).

Depending on what food product is to be packed, i.e. its composition and storage sensitivity, its shelf-life, additional laminate layers—or laminate layers of other types than LDPE—may be included in the laminate structure. Examples of such additional or other laminate layers may be material layers possessing superior gas barrier properties, such as an aluminium foil or a layer of polyamide or of copolymers of ethylene and vinyl alcohol. Certain food products, such as juice, moreover place more stringent requirements to the effect that the packaging material possess superior aroma barrier properties, i.e. prevent flavour deterioration as a result of non-polar flavour and aroma substances being absorbed from the packed product into the packaging material. At the same time as the package must afford the product the best possible product protection properties, production of such single-use packages must also be simple and rational in order to be economically viable.

Within the prior art technology, polyethylene terephthalate (PET) has often been proposed as a material possessing superior aroma barrier properties, suitable for the inside layer in a packaging container for direct contact with the packed product, as opposed to, for example, LDPE. PET possesses extremely good barrier properties against essential oils such as D-limonen and other non-polar flavour and nutrient substances in, for example, orange juice and is, therefore, a highly desirable material for this purpose. However, PET suffers from the major drawback in employment as the innermost laminate layer in a packaging container for direct contact with the packed product in that it is difficult to thermoseal at rational production speeds, in particular on sealing of the longitudinal joints in a packaging container produced from a sheet-shaped packaging laminate blank in which the longitudinal edges of the sheet-shaped blank overlap one another and are exposed such that the outside of the inner edge is sealed against the inside of the outer edge. In rational production of conventional packaging containers, such longitudinal joint sealing takes place at very high speeds, in that the sheet-shaped blanks in rapid sequence are advanced, reformed and longitudinally sealed by means of thermosealing into tubular packaging container blanks. The term “tubular” is hereafter taken to signify tubes of both circular and quadratic or rectangular cross section. For thermosealing of PET, it is necessary that the pressure from the sealing jaws is maintained during the heating process, at least up to approximately 165° C., which takes roughly 0.5 sec. However, the available stay time during the sealing process on sealing of longitudinal joints, i.e. the time during which the pressure from the sealing jaws is maintained, is only approx. 0.01 sec., and thereby insufficient. On the other hand, sealing of the top and bottom of the same packaging containers takes place intermittently in connection with the product being filled into the container, which permits longer stay times in the sealing operation proper, and thereby makes for thermosealing by means of surface fusion between two PET layers.

Attempts have been made to overcome these difficulties in various manners, for example by employing a modified PET which facilitates thermosealing. From, for example, European Patent Application EP 0 237 235, it is known that glycol-modified PET, so-called PETG, may be thermosealed. However, a serious drawback inherent in this glycol-modified PET is that it results in a more brittle material layer with less flexibility and durability and is thus not as desirable in a packaging laminate as normal, amorphous, non glycol-modified PET. Moreover, nor can thermosealing take place using PETG at such high production speeds as are actually desirable.

A method of attempting to circumvent the difficulties in the heat sealing of packaging blanks with difficulty sealable inside lavers such as amorphous PET has been to seal the longitudinal overlap joints with hot melt glue, i.e. by applying a hot melt glue along the one edge in the form of a strand by means of a nozzle and then compress this edge with the other edge in the overlap joint between the two edges. However, it has not hitherto been possible to achieve uniform and operationally reliable application at rational sealing speeds with the aid of this technology. Major problems have been encountered with large quantities of waste hot melt glue and with the fact that the application of the hot melt glue becomes uneven and difficult to control at those small quantities which are required, with tacky outflows as a result In order that a hot melt glue be able to adhere to surfaces of PET, and surfaces with similar adhering properties as PET, it is necessary that the glue be extremely tacky, i.e. extreme adhesion or bonding forces against the surface intended for gluing, which in turn entails that the hot melt glue becomes difficult to handle on application, and that the control of the applied quantity and the problem of outflowing glue is aggravated. As a result of uneven application, the strength of the glued joints will also be uneven and consequently the tightness properties of the packaging container in the sealing joints are unreliable. Moreover, the high tacky or adhesive forces entail that the application speed is limited to unrational production speeds, for which reason hot melt glue sealing of packaging containers for liquid foods on an industrial scale hardly occurs on the market today. The outflow of the applied hot melt glue strand will also be uneven, since hot melt glue has not been applied at certain points in a sufficient quantity to cover the entire width of the gluing region and at other points has been applied in an excessive quantity and therefore flows out beyond the sealing region, which can result in visible, unsightly hot melt glue lumps outside the sealing joints and, in certain cases, that the excess hot melt glue comes into direct contact with the packed product.

An applicator nozzle continuously feeds a strand of hot melt glue, with the result that it is as good as impossible to apply a hot melt glue strand to sheet-shaped packaging blanks which pass the nozzle with interspace between them, but that the hot melt glue sticks and tacks to every area. The applicator nozzle cannot be shut off and turned on at the same rate, partly because the inertia in such a system with high viscosity hot melt glue renders it difficult to control the applied quantity at the beginning and at the end of the sheet, and partly since a nozzle for intermittent feeding more easily becomes blocked and otherwise causes operational disruption.

Another difficulty in the striving to produce a packaging container with superior aroma barrier properties is that such a hot melt glue sealed longitudinal joint is not durable in long-term cold storage. Thus, such a packaging container has not displayed durable shelf life for a lengthy period of time with superior liquid, gas and aroma barrier properties, because of the fact that the hot melt glue sealed longitudinal joint has become untight.

In respect of liquid-, gas-, and aroma barrier properties, such incision edges of the sheet-shaped packaging blank which are freely exposed to the packed product create problems in that gas and liquid molecules, like non-polar flavour substances, are slowly absorbed in the packaging material through the thus freely exposed incision edges.

Thus, within the prior art technology, it has not hitherto been possible, in a cost effective and rational manner, to produce packaging containers from substantially planar packaging blanks with inside and sealing layers with properties similar to PET as regards thermosealing properties and adhesion to hot melt glue.

Nor has it hitherto been possible in a cost effective and rational manner using a hot melt glue to longitudinally joint seal packaging containers from packaging blanks with inside layers of non-thermosealable or difficultly thermosealable plastics, such as, for example, PET, this inside layer moreover displaying poor adhesion properties vis-à-vis conventional hot melt glue.

OBJECTS OF THE INVENTION

One object of the present invention is therefore to realise a novel method of producing and sealing packaging containers of the type described by way of introduction, without consequential problems of the type intimately linked to the prior art technology.

Another object of the present invention is to realise a novel method for simple and rational production of packaging containers from substantially planar packaging container blanks with inside and sealing layers of PET, or a material possessing properties similar to PET, as regards thermosealing and hot melt glue sealing.

A further object of the present invention is to realise a novel method, by means of reforming and hot melt glue sealing of substantially planar packaging blanks, for producing packaging containers for liquid foods.

Still a further object of the present invention is to realise a novel method, by means of hot melt glue sealing, for simply producing durable and well-sealed packaging containers from substantially planar packaging blanks for liquid foods, at rational, high production speeds.

A particular object of the present invention is to realise a novel method of producing a cost effective packaging container possessing superior gas and aroma barrier properties, from a packaging laminate blank with inside and sealing layers of PET, or a material layer with similar sealing properties and aroma barrier properties, for the packing of liquid foods.

Yet a further object of the present invention is to realise a novel apparatus for applying and sealing by means of a hot melt glue in the production of packaging containers for liquid foods.

SOLUTION

These and other objects have been attained by means of a method displaying the characterizing feature as set forth in the characterizing clause of appended Claim 1. Preferred embodiments of the method according to the present invention are apparent from appended subclaims 2 to 16.

A packaging container produced using the method according to the present invention has the characterizing features as set forth in appended independent Claim 17. An apparatus for carrying out the method according to the present invention has the characterizing feature as set forth independent Claim 18, while preferred embodiments of the apparatus according to the present invention are apparent from appended subclaims 19 to 27.

Thus, a simple and rational process together with an apparatus have been developed for producing packaging containers for liquid foods, for applying hot melt glue and subsequent sealing of sheet- or web-shaped blanks of a packaging laminate. According to the present invention, such an apparatus includes an applicator roller which may be heated up to a temperature adapted to the hot melt glue employed. The applicator roller is heatable by means of electrically powered heat cartridges within the roller, the heat cartridges being connected to a control unit for adjusting the desired temperature of the roller. The circumferential surface of the roller preferably consists of steel, most preferably hardened steel, with a good wear resistance, i.e. with a hardness of a minimum of 56 Rockwell. The temperature difference between the circumferential surface of the heated roller and the surface of the packaging blank intended for hot melt glue application, at lower temperature, normally room temperature, entails that the hot melt glue adheres better to, and is thereby transferred to the packaging blank.

For applying the hot melt glue on the heated roller, use is made of a hot melt glue unit of conventional type, which preheats and heats the solid, cold starting material, in the form of granules, pellets or bars of a polymer composition suitable for the hot melt glue, so as to be transformed into molten form and feed a molten strand of glue by means of a hot melt glue pistol or a similar heating device with nozzle, onto the roller. The hot melt glue strand applied on the roller is heated by the circumferential surface of the heated roller to the preset application temperature and is transferred partly to the packaging blank surface in the form of a thin, narrow strand.

The outflow of the hot melt glue strand applied to the packaging blank is preferably governed with the aid of a counter roller which, by means of counter pressure, acts on the other side of the packaging blank in the application region. By such means, the width and thickness of the applied strand can be better controlled.

Because of the extreme tackiness of a hot melt glue, not all of the hot melt glue strand applied on the surface of the applicator roller can be transferred to the surface of the packaging blank. The hot melt glue which is not transferred to the packaging blank, i.e. the surplus on the applicator roller after it has passed the packaging blank surface, is removed from the applicator roller preferably by means of scraping with a doctor blade. The scraped-off surplus is collected in a surplus receptacle to be duly recycled by once again being converted into granules, pellets or bars as starting material for hot melt glue application. Such a doctor blade functions all the better if it is heated to a scraping temperature suitably adapted for the hot melt glue, for example almost the same temperature as the application temperature. Moreover, the doctor blade may advantageously be designed with lateral guide elements disposed on the blade, or so-called ploughs or guides so that the scraped-off hot melt glue is "guided" or led towards the centre of the doctor blade for the formation of a narrow, uniform flow of hot melt glue surplus which is removed from the roller surface.

Suitable hot melt glues for the method according to the present invention have a sufficiently high tackiness and good adhesion capacity to be able to adhere to surfaces of PET and surfaces with similar properties. At the same time, it must have sufficiently mutual cohesive forces to be able to be applied in the form of a thin, uniform strand with an outflow adapted to its purpose. The hot melt glue should further be approved in compliance with FDA's standards for the materials in use for the packing of foods, and possess superior sealing properties in the filling packaging containers, adapted for the storage and use which each respective packed product demands. In particular, a hot melt glue has been developed for the method according to the invention which has a combination of superior application and sealing properties, as well as good shelf life during long term storage, even cold storage. Such a glue has a high so-called tacking point and high viscosity and is applied against the surfaces intended for gluing at a high temperature relative to conventional hot melt glues.

Principally, the method according to the present invention solves the problem that hot melt glue sealed sealing surfaces of PET type, i.e. such surfaces which are difficult to thermoseal and which also in hot melt glue sealing possess poor adhesion properties. Thus, for sealing such surfaces, there is required a hot melt glue with extra high tackiness and that the application of the hot melt glue takes place at relatively high temperature. Also other materials than PET, but with similar surface properties suitable for sealing layers in laminates for packaging containers for liquid foods can, however, be sealed by means of the method and the apparatus according to the present invention, such as for instance polyesters and polyamides.

According to one preferred embodiment of the method according to the invention, sheet- or web-shaped blanks of a packaging laminate with an inside layer of amorphous PET are fold formed and sealed so that, in sealing operation, two surfaces of PET are sealed to one another. One packaging container particularly developed for long term cold storage of liquid foods, preferably longitudinally joint sealed by means of the method according to the present invention, has become the subject matter of a parallel patent application co-filed on the same day and by the same applicant and entitled "Packaging Container For Cold Storage Of Liquid Foods, And A Method For Producing The Packaging Container".

A suitable hot melt glue for the present invention should give good adhesion to different substrates and possess good durability in cold storage, i.e. be flexible even at low temperatures. At the same time, it is necessary that the glue possess a high so-called tacking point and high viscosity in order to give sufficiently good adhesion properties against PET which implies that the molten glue must be applied at a relatively high temperature.

A hot melt glue which functions well for sealing two surfaces of PET is based on a copolymer of ethylene and vinyl acetate in a composition with rosin ester resin and has a softening or melting temperature at approx. 80–100° C., preferably approx. 90–100° C., and a "Thermosel" thermal viscosity of approx. 30000–45000 cp, more preferably 36500 cp at 190° C. (375 F.) (27/5.0), alternatively less preferably, a Thermosel viscosity of approx. 60000–70000 cp, at 177° C. (350 F.) (27/2.5) and approx. 25000–35000 cp, at 204° C. (400 F.) (27/5.0). A high tacking or softening point also ensures that the longitudinal hot melt sealing joint will not be negatively influenced by the high sealing temperature of the subsequent intermittent transverse, or top and bottom, heat sealing operation, by re-melting or re-softening of the hot melt in the joint.

In order that such a hot melt glue adheres against a surface of PET, the temperature of the glue must be at least approx. 180° C., preferably approx. 190–200° C., but not higher than approx. 220° C. At lower temperatures than approx. 180° C., the glue strives excessively against being transferred from the applicator roller to the packaging laminate, and at temperatures higher than approx. 220° C., there is a risk of discoloration and degradation of both the hot melt glue and other polymer layers included in the packaging laminate.

According to one preferred embodiment of the method and the apparatus according to the invention, the surface of the applicator roller is made of hardened steel with a coating possessing good slippage properties in relation to hot melt glue, countersunk in a groove in the surface along the circumference of the roller surface. The groove and the countersunk coating have as good as the same width as the region on the packaging laminate intended for hot melt glue application. The coating is approved in compliance with the FDA standards for materials for handling of and contact with foods and has good chemical resistance, as well as thermal resistance up to approx. 230° C. Such a coating is preferably applied by means of so-called plasma coating techniques, i.e. deposition of a material layer from a plasma generated by radiation energy, and consists substantially of a ceramic material. Alternatively, such a coating may consist of a substantially Teflon® based material. The slippage properties of the coating in relation to the hot melt glue facilitate the transfer of the hot melt glue from the applicator roller to the surface of the packaging laminate so that a major proportion, as much as approx. 50–70% of the glue applied on the applicator roller is also transferred to the substrate. An applicator roller without such a "slippage coating" is capable of transferring approx. 30% of the hot melt glue. At the same time, the coating makes it possible for the hot melt glue to be applied on the surface of the packaging laminate in the form of a thin, fine strand of uniform width and thickness. The coating is countersunk in a groove in the surface of the applicator roller so as not to be subjected to wear against the above mentioned doctor blade, in which event the roller surface preferably consists of a wear resistant, hardened steel for protecting the coating even after a lengthy period of use.

The application quantity of hot melt glue is adapted to the type of sealing joint, but a well-functioning quantity for, for example longitudinal joint sealing between surfaces of amorphous PET is a strand of a width of approx. 4–5 mm and a thickness of approx. 50–100 μm, preferably approx. 60–70 μm, most preferably approx. 65 μm.

In order further to promote good adhesion and gluing between the applied hot melt glue strand and the opposing surface intended for sealing, one or both of these may advantageously be treated with a flame from one or more gas burners disposed just ahead of the step for compression and sealing.

The above described method for applying and sealing a hot melt glue for sealing of PET surfaces can be carried out at a speed of approx. 380–400 m/min., probably even at such high speeds as approx. 600 m/min., which is a normal speed for thermosealing between thermoplastics, such as for example polyethylene. On testing of the method according to the present invention, the capacity of the hot melt glue unit with which the hot melt glue is applied to the applicator roller has, however, so far limited the production speed to approx. 400 m/min.

Thus, the method and the apparatus according to the present invention are primarily intended for hot melt glue sealing and the production of packaging containers from packaging blanks including an aroma barrier and inside layer, i.e. that layer which is turned to face inwards in a packaging container produced from the packaging laminate, of amorphous polyester, preferably PET, or materials possessing similar properties as regards thermosealing and hot melt glue sealing properties. Normal process facilitating additives employed in the prior art technology may be added to such amorphous PET in order to facilitate extrusion and application of a film or layer of PET in a packaging laminate.

A laminated packaging material for packaging containers according to the invention may include a core layer of paper or paperboard of packaging quality.

For obtaining superior gas barrier properties for protecting the packed product, such as, for example, the vitamin C content in orange juice, a separate layer of a material possessing superior gas barrier properties may be provided in such a packaging laminate. Polymer gas barrier materials are today the most desirable in the new development of packaging materials, since they are, both from the point of view of recycling and the environment, and from the point of view of cost, to be deemed preferable. Well-known polymer gas barrier materials are, for example, polyamide (PA) or copolymers of ethylene and vinyl alcohol (EVOH).

Such a gas barrier layer may be laminated to surrounding layers, preferably disposed between the above-mentioned core layer and aroma barrier layer, by means of interjacent adhesive layers of an adhesive polymer, such as, for example, an acid-modified polyethylene. The barrier laver with interjacent adhesive layer may advantageously be laminated to the core layer with the aid of a lamination layer of, for example, LDPE for obtaining optimum adhesion and lamination strength. It is also conceivable, depending on the quality and adhesions properties of the gas barrier layer, that this be applied direct on the core layer by means of extrusion.

Preferably, the inside/aroma barrier layer can be laminated to the gas barrier layer with the aid of an interjacent adhesive layer of the same type of acid-modified polyethylene.

On the outside of the packaging laminate, i.e. that side which forms the outside of a packaging container produced from the packaging laminate, a layer of a liquid-tight thermosealable polymer, preferably LDPE, may, for example, be applied.

The above-described packaging laminate may preferably be produce by multi layer co-extrusion of two or more of the gas barrier layer, the adhesive layers and the aroma barrier layer on the one side of the core layer. Naturally, it is also possible to prefabricate a film of the layers included in the inside of the packaging laminate which are laminated to the core layer.

With a view to achieving the requisite superior gas and aroma barrier properties in lengthy storage of a packaging container produced by the method according to the present invention, it is moreover advantageous to protect the incision edges of the packaging blank from contact with the packed product in the packaging container. This may be put into effect in different, per se known manners, for example by applying separate protective strips over the incision edges. Since the problem with difficultly sealed PET layers remains unsolved, the covering of the incision edges with separate strips is, as a result, not a good solution.

By, instead, splitting and partly removing, by so-called "skiving", the longitudinal edge of the packaging blank which is on the inside of a container produced from the packaging blank, i.e. the inner edge, for the formation of a projecting strip of half of the thickness of the packaging laminate including the inside layer of PET and folding back and sealing the projecting strip against the outside of the packaging laminate, the incision edge is concealed behind the outer edge (see FIG. 6) and, thus, does not come into contact with the packed product. The skived and double folded strip is sealed against the outer overlapping edge's PET inside, which avoids the situation that incision edges and other material than PET come into direct contact with the packed product in the longitudinal joint region of the inside of the packaging container.

The skived and double folded strip including the inside layer of PET is sealed to the outside of the inner edge partly by means of thermosealing along a narrow region in which the outermost longitudinal edge of the strip meets the non-skived outside layer of LDPE of the packaging laminate, and partly in that the hot melt glue applied for the longitudinal joint sealing flows out to the outermost edge of the strip and seals this against the unskived packaging laminate in the inner edge.

The top and bottom portions of the packaging container are also fold formed in such a manner that exposure of incision edges to the packed product is precluded. One example of possible top and bottom fold formation techniques according to the invention is represented by a gable top package of the "Tetra Rex"® type. In order to avoid incision edge exposure in the fold formed bottom in such a packaging container, one of the bottom panels may, in a per se known manner, be provided with a small projection which may be folded outwards towards the outside of the packaging container and sealed in beneath the outermost bottom panel in order to turn the incision edge outwards away from the inside of the packaging container.

BRIEF DESCRIPTION OF THE ACCOMPANYING DRAWINGS

Figure 2A:
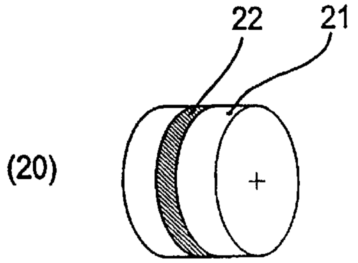
Figure 2B:
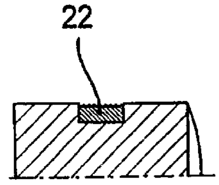
Figure 3:
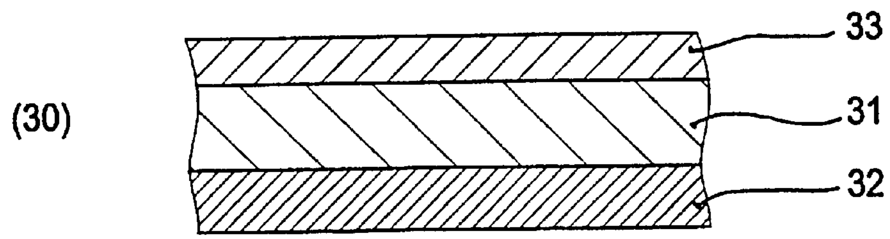
Figure 4:
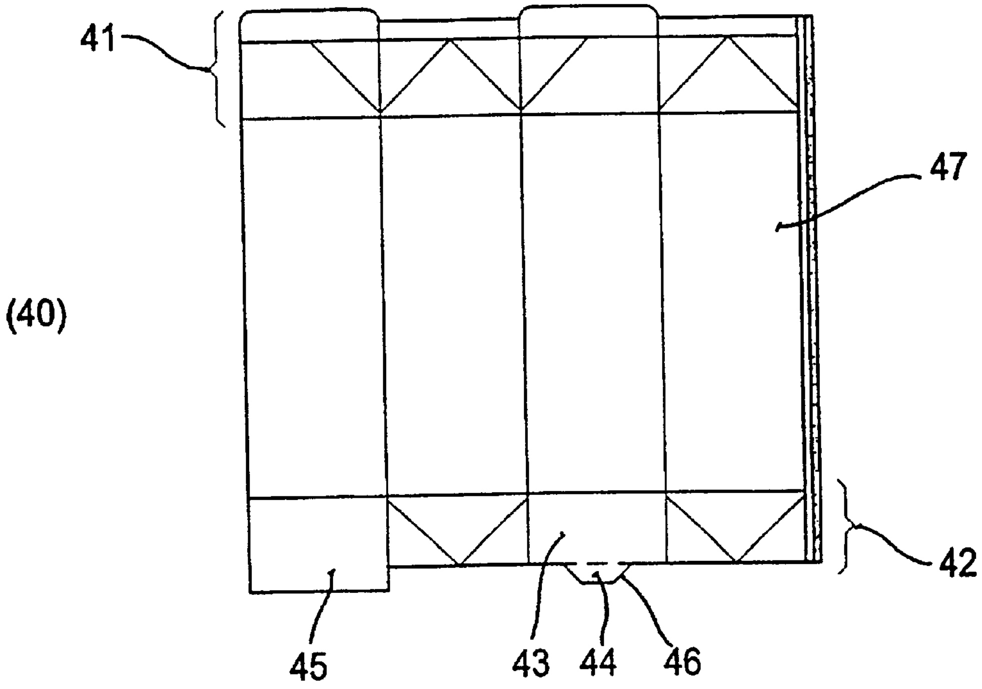
Figure 5:
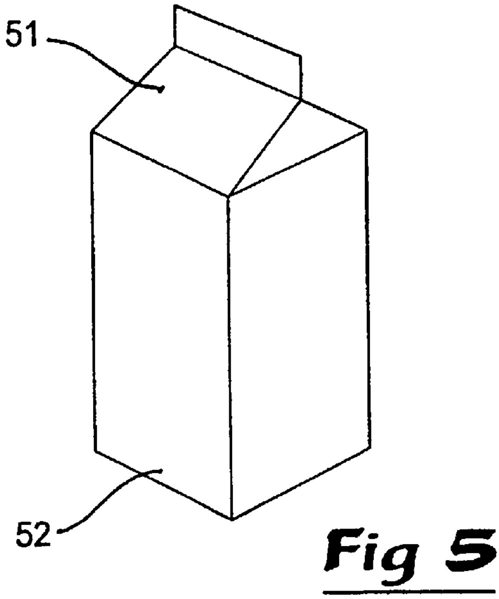
Figure 6:
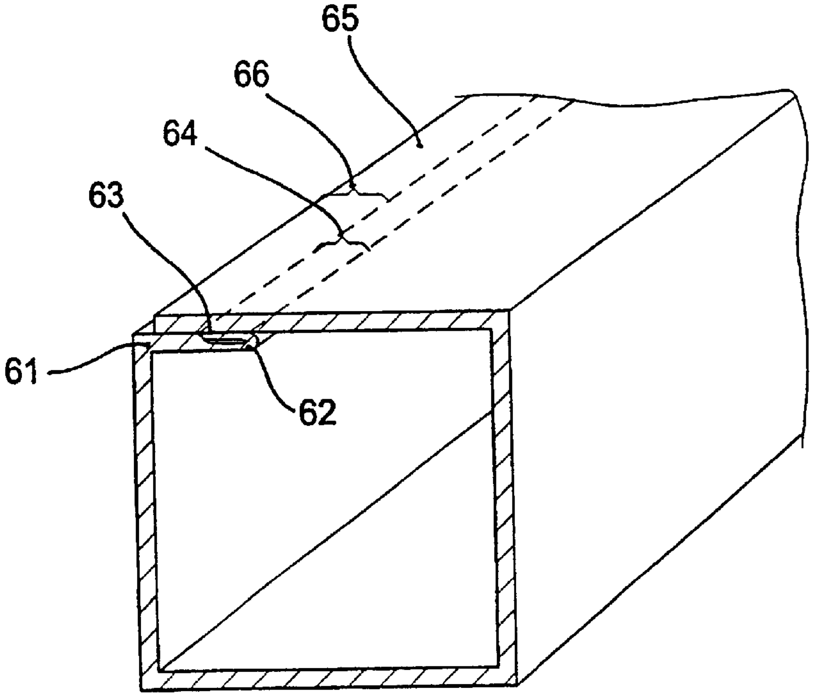

The present invention will now be illuminated/described in greater detail hereinbelow with reference to the accompanying Drawings, in which:

FIG. 1 schematically illustrates an apparatus according to the present invention for applying a hot melt glue and sealing a packaging laminate blank on the production of packaging containers for liquid foods;

FIGS. 2*a* and 2*b* schematically illustrate one preferred embodiment of the heated applicator roller in the apparatus according to the invention, seen with a view obliquely from the front (FIG. 2*a*) and seen in a cross-sectional perspective through the width of the roller surface (FIG. 2*b*);

FIG. 3 schematically shows a cross section through a preferred laminated packaging material for a packaging container according to the invention;

FIG. 4 schematically shows the eventual appearance of a sheet-shaped packaging laminate blank for the preferred packaging container according to the invention of FIG. 5;

FIG. 5 schematically illustrates a preferred example of a packaging container according to the present invention; and FIG. 6, with a cross section through a longitudinally sealed tubular carton blank produced from the packaging laminate blank of FIG. 4, schematically illustrates how the inner longitudinal edge in a packaging container is skived, double folded and sealed against the outer longitudinal edge.

DESCRIPTION OF PREFERRED EMBODIMENT

FIG. 1 thus shows an apparatus according to the present invention for applying and sealing, by hot melt glue, a packaging laminate blank in the production of packaging containers for liquid foods, comprising an applicator roller 11 which, on use, may be heated to an application temperature adapted to the hot melt glue. Hot melt glue is applied to the applicator roller 11 in the form of a strand by means of a hot melt glue pistol, a gap nozzle or a similar heating device 12 which converts the solid starting material, normally in the form of granules, pellets or bars, to a molten mass. The starting material is fed to the melting device from a container 13 containing the granules, pellets or bars. The molten glue is applied to the applicator roller in a quantity which is adapted to a predetermined speed of the applicator roller. The molten hot melt glue is then transferred from the applicator roller 11 to a packaging blank 40 in the form of a uniformly thin and uniformly wide strand whose outflow is governed within the region intended for gluing by means of a counter roller 14 which acts on the other, opposing side of the packaging blank with a pressure adapted to the hot melt glue and the gluing surface. The distance between the counter roller and the applicator roller is adapted so that no hot melt glue is capable of being transferred from the applicator roller to the counter roller when no packaging blank is advanced and passes through the nip between the rollers. On hot melt glue application on sheet-shaped packaging blanks, no hot melt glue is thus transferred in the interspaces between the passing packaging blanks. Surplus of hot melt glue on the applicator roller, i.e. hot melt glue which is not transferred from the roller to the surface of the packaging blank accompanies the roller back, may be scraped off with the aid of a doctor blade 15, be collected in a receptacle 18 and, in due course, be recycled by reconversion into new starting material. Preferably, such a doctor blade consists of hardened steel and may be heated to a suitable scraping-off temperature adapted to the hot melt glue, for example as good as the same as the selected application temperature of the applicator roller.

In order further to promote good adhesion between the applied hot melt glue strand and the opposing surface intended for sealing, one or both of these may advantageously be rapidly flame treated by means of one or more gas burners 16 disposed immediately ahead of the step for compression and sealing.

According to one preferred method of sealing an overlapping joint in a packaging container produced from a packaging laminate whose surfaces are difficult to seal to one another, and which packaging container must, on the inside, be completely tight against the penetration of moisture, gas and non-polar aroma and flavour substances, the apparatus according to the present invention also includes a first part stage with a so-called skiving unit 17, i.e. a unit in which one of the edges of the packaging blank intended for sealing is skived, half of the thickness of the packaging laminate being removed in a narrow region along the edge, for the formation of a projecting strip consisting of half of the packaging laminate and including the outer layer possessing good aroma barrier properties. The projecting strip is folded double so that the aroma barrier laver is outermost on the double folded edge and is thereafter advanced to the applicator roller 11 for the application of the hot melt glue.

In order to facilitate the transfer of the heated hot melt glue from the applicator roller 11 to the surface of the packaging laminate 40, the surface 21 of the roller is preferably provided with a coating 22 countersunk in a groove along the circumference of the roller surface, which is schematically apparent from FIG. 2, the coating possessing superior slippage properties in relation to the hot melt glue.

The roller surface 21 consists of steel, preferably hardened steel, in order to withstand the wear from the doctor blade 15 which wears against the surface of the roller by scraping it. The coating 22 is countersunk in the steel surface in order to avoid the wear from the doctor blade, and is chemically resistance and resistant to temperatures of at least 220° C. Such a coating is preferably applied by means of so-called plasma coating techniques, i.e. deposition of a material layer from a plasma generated by means of high radiation energy, and consists substantially of a ceramic material. Alternatively, such a coating may consist of a substantially Teflon® (based material.

FIG. 3 schematically illustrates a cross section of one example of a laminate packaging material intended for a packaging container produced by means of the method according to the present invention, the packaging material carrying the generic reference numeral 30. The packaging laminate 30 includes a core layer 31 of paper or paperboard of suitable packaging quality.

The inside layer 32, i.e. the layer which is turned to face inwards in a packaging container produced from the packaging laminate for direct contact with the packed product, thus functions as a barrier layer against essential oils, such as, for example, D-limonen, and other non-polar flavouring substances, and consists of an amorphous, difficultly sealed PET such as, for example, "Eastapak 9921" from Eastman Chemical Company.

Between the above-mentioned aroma barrier layer 32 and the core layer 31, additional layers may be provided, depending on the properties which are desired in the packaging laminate. According to one embodiment of the present invention, a layer possessing superior gas barrier properties, for example a polyamide or a mixture of different polyamides may advantageously be applied between the core layer and the outer layer 32. Preferably, a layer of a PA of the type "Selar PA 3508"® from DuPont, or a layer of a mixture of PA-6 and another polyamide possessing superior processing and gas barrier properties is applied.

Further, the core layer on the inside may be coated with a layer of LDPE for good adhesion and lamination strength between the core layer and other inside layers.

Between the above-mentioned gas barrier, aroma barrier and lamination layers, interjacent adhesive layers may advantageously be applied, for obtaining a well-intergrated packaging laminate displaying good adhesion and lamination strength between the different laminate lavers. Such adhesive layers may, for example, consist of maleic acid anhydride-modified polyethylene of the type Admer® or Bynel®. Where applicable, depending on polyamide quality, adhesive layers may be omitted and the above-mentioned polyamide layer extruded direct on the core layer 11.

Finally, the other, outer side of the core layer is provided with an outside layer 33 of LDPE, for protecting the paper core layer against moisture and dirt on the outside of the packaging container.

The packaging laminate 30 may be manufactured in that the layers which are turned to face towards the inside of a packaging container produced from the packaging laminate are applied on a core layer 31 or a core layer coated with LDPE by means of multi layer co-extrusion. The different inside layers can also be co-extruded for the formation of a prefabricated film which is then laminated to the core layer in a conventional manner by means of thermolamination or extrusion lamination.

FIG. 4 shows the preferable appearance of a sheet-shaped blank 40 of, for example, a packaging laminate 30 for producing, for instance, a packaging container 50, with top folding portion 41, bottom folding portion 42 and one or more side wall panels 47. The incision edge 46 of the inner bottom panel 43 normally partly comes into contact with the packed product, but is, according to the present invention, provided with the projection 44 which is folded outwards under the bottom of the packaging container and sealed against the outer bottom panel 45 for protecting the above-mentioned incision edge.

FIG. 5 shows one example of a packaging container 50 according to the present invention, a so-called Tetra Rex® package. As a result of the typical gable top folding portion 51, no free incision edges are exposed to the packed product. In the bottom fold 52, incision edge exposure as described in FIG. 4 is avoided in that a small projection on one of the bottom panels is folded outwards, whereupon the incision edge of the projection is concealed behind the outermost bottom panel and instead the fold edge without incision edges comes into direct contact with the packed product FIG. 6 shows how a sheet-shaped blank of, for example, the packaging laminate 30 has preferably been fold formed and longitudinally joint sealed into a tubular packaging blank 60 of square or rectangular cross section. The inner, longitudinal edge 61 has been split, i.e. skived in a skiving unit in the apparatus according to the present invention along the edge so that half of the thickness of the packaging laminate has been removed, while the inner laminate layers, including the PET layer 32, have been left in place, for the formation of a projecting strip 62. The strip 62 has been folded back to the inner longitudinal edge's outside and sealed against the non-skived outside layer 33 of LDPE in the edge of the skived region 63, by heating and the application of hot melt glue along the skived longitudinal inner edge 64 in a evenly applied strand, and thereafter compressed with the overlapping, outer longitudinal edge 65 for the formation of a durable and tight longitudinal sealing joint Application of hot melt glue preferably takes place by means of roller application at a speed of at least approx. 380 m/min. The double folded strip 62 has approximately the same thickness as the non-skived packaging laminate so that the sealing pressure may be distributed uniformly over the entire width of the overlapping sealing joint. For optimum adhesion between, for example, PET surfaces and hot melt glue, there is moreover carried out a flame treatment of the applied hot melt glue strand, and the opposing sealing surface of PET intended for sealing, on the inside 65 of the outer edge, immediately prior to compression of the sealing joint. The overlapping portion of the outer, longitudinal edge 66 is sealed against the inner edge's outside layer of LDPE by means of thermosealing, which is made possible in that the LDPE surface along the overlapping region 66 of the inner edge 61 has first been pre-treated with some surface activation treatment, preferably corona treatment.

With a packaging container of a packaging laminate 30 or a packaging blank with PET inside which has been longitudinally joint sealed in the above-described manner using the method according to the present invention, extremely good aroma barrier properties will be attained during lengthy storage at reasonable production costs.

From the foregoing description, it will thus be apparent that the present invention, in a simple manner and with simple means, satisfies the established objects and realises a simple and rational method and an apparatus for producing packaging containers for liquid foods by means of hot melt glue sealing of sheet- or web-shaped packaging blanks.

While the present invention has been described in greater detail with reference to specific embodiments shown on the Drawings, it will be obvious to a person skilled in the art that various modifications and variations may be made without departing from the inventive concept as this is defined in the appended Claims.

What is claimed is:

1. A method of producing, from a sheet- or web-shaped packaging blank, a packaging container for liquid foods, by reforming the packaging blank and permanently uniting and sealing at least two of its edges (61, 65) by means of a hot melt glue, characterized in that the hot melt glue is applied along one of the two edges by means of a heated applicator roller (11).

2. The method as claimed in claim 1, characterized in that the hot melt glue is applied to the hot roller (11) in the heated state; and that the hot roller heats the hot melt glue to an application temperature adapted to the hot melt glue.

3. The method as claimed in claim 1, characterized in that the surface (21) of the hot roller is made of (hardened) steel with a coating (22) countersunk in a groove in the surface along the circumference of the roller surface, the coating having good slippage properties in relation to the hot melt glue, and said coating being of a width corresponding to the region intended for application.

4. The method as claimed in claim 1, characterized in that said coating (22) is chemical-resistant and withstands temperatures of at least 230° C.

5. The method as claimed in claim 1, characterized in that said coating (22) is coated by means of so-called plasma coating techniques.

6. The method as claimed in claim 3, characterized in that said coating (22) substantially consists of a ceramic material.

7. The method as claimed in claim 1, characterized in that the hot melt glue is transferred from the hot roller (11) to the edge of the packaging laminate blank (40) in the form of a uniformly wide and uniformly thick strand; and that the application quantity of hot melt glue, i.e. the thickness and outflow of the strand, is governed by means of the pressure of a counter roller (14), said counter roller acting on the opposite side of the packaging laminate blank within that region which corresponds to the application region for said strand of hot melt glue.

8. The method as claimed in claim 1, characterized in that non-applicated surplus of hot melt glue from the hot roller is scraped off by means of a doctor blade (15) and recycled in order to be reheated and applied to the hot roller.

9. The method as claimed in claim 8, characterized in that the doctor blade (15) is heated to a scrape-off temperature adapted to the hot melt glue.

10. The method as claimed in claim 1, characterized in that the application of hot melt glue with the hot roller (11) on the sheet-shaped packaging laminate blank (40) takes place at a speed of at least 380 m/min.

11. The method as claimed in claim 1, characterized in that the hot melt glue is a composition including a copolymer of ethylene and vinyl acetate and rosin ester and has a softening temperature at 80–100° C., and a thermal viscosity of 60000–70000 cp at 177° C. (350 F.) (27/2.5), 30000–45000 cp at 190° C. (375 F.) (27/5.0), and 20000–35000 cp at 204° C. (400 F.) (27/5.0).

12. The method as claimed in claim 1, characterized in that the desired application temperature is at least 180° C.

13. The method as claimed in claim 1, characterized in that the applied hot melt glue strand and glue surface on the opposing edge are flame treated before the edges intended for sealing are pressed together.

14. The method as claimed in claim 1, characterized in that said packaging laminate includes a core layer (31) of paper or paperboard and an outer layer (32) of PET.

15. The method as claimed in claim 1, characterized in that a sheet-shaped packaging laminate blank (40) is reformed into a tubular blank (60) with overlapping longitudinal edges (61, 65) in a first step, said edges being permanently united and sealed to a longitudinal sealing joint by means of a hot melt glue in a second step, that the one end of the tubular blank is reformed and sealed for the formation of a tubular carton with a bottom in a third step; and that the carton is thereafter filled with its contents and finally sealed in its other end, for the formation of a packaging container (50), in a fourth step.

16. The method as claimed in claim 15, characterized in that the longitudinal edge (61) facing towards the inside of the packaging container is split by means of so-called skiving, whereupon half of the thickness of the packaging laminate is removed in a region along the edge, for the formation of a longitudinal strip (62) projecting from the edge, said strip being double folded and sealed to the outside (63) of the packaging laminate; and that the skived and double folded edge (62) is sealed to the opposing, overlapping inside of the outer edge (65) with the aid of hot melt glue.

17. A packaging container (50) produced by means of the method as claimed in claim 1.

18. An apparatus (10) for applying hot melt glue and sealing a packaging laminate blank (40) in the production of packaging containers for liquid foods, characterized in that it includes an applicator roller (11) which, on use, may be heated to an application temperature adapted to the hot melt glue.

19. The apparatus as claimed in claim 18, characterized in that it moreover includes a counter roller (14) acting on the opposing side of the packaging laminate.

20. The apparatus as claimed in claim 18, characterized in that the surface (21) of the heatable roller is made of hardened steel with a coating (22) countersunk in a groove in the surface along the circumference of the roller surface, and possessing good slippage properties in relation to hot melt glue, said coating being of a width corresponding to the region intended for application.

21. The apparatus as claimed in claim 20, characterized in that said coating (22) is chemical-resistant and withstands temperatures of at least 230° C.

22. The apparatus as claimed in claim 20, characterized in that said coating (22) is applied by means of so-called plasma coating techniques.

23. The apparatus as claimed in claim 20, characterized in that said coating (22) substantially consists of a ceramic material.

24. The apparatus as claimed in claim 18, characterized in that it further includes a doctor blade (15) for scraping off surplus of non-applied hot melt glue from the heated roller.

25. The apparatus as claimed in claim 24, characterized in that the doctor blade (15) may also be heated to a scrape-off temperature adapted to the hot melt glue.

26. The apparatus as claimed in claim 18, characterized in that further includes one or more burners (16) for flame treatment of the applied hot melt glue and/or the surface against which the applied hot melt glue is to be applied.

27. The apparatus as claimed in claim 18, characterized in that it further includes a skiving unit (17) for skiving and double folding of one of the edges of the packaging laminate blank intended for hot melt glue sealing.

* * * * *